United States Patent
Arensmeier

(10) Patent No.: US 10,591,177 B2
(45) Date of Patent: Mar. 17, 2020

(54) SYSTEM AND METHOD FOR THERMOSTAT DETECTION OF CONDENSATE SWITCH TRIPPING

(71) Applicant: Emerson Electric Co., St. Louis, MO (US)

(72) Inventor: Jeffrey N. Arensmeier, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 45 days.

(21) Appl. No.: 16/055,802

(22) Filed: Aug. 6, 2018

(65) Prior Publication Data

US 2020/0041155 A1  Feb. 6, 2020

(51) Int. Cl.
| | | |
|---|---|---|
| F24F 11/32 | (2018.01) | |
| G05B 23/02 | (2006.01) | |
| F24F 11/62 | (2018.01) | |
| F24F 11/52 | (2018.01) | |

(52) U.S. Cl.
CPC .............. *F24F 11/32* (2018.01); *F24F 11/52* (2018.01); *F24F 11/62* (2018.01); *G05B 23/0221* (2013.01)

(58) Field of Classification Search
CPC . F24F 11/32; F24F 11/62; F24F 11/52; G05B 23/0221
See application file for complete search history.

(56) References Cited

U.S. PATENT DOCUMENTS

| | | | | | |
|---|---|---|---|---|---|
| 4,713,209 | A | * | 12/1987 | Ishimaru | G21D 1/02 376/211 |
| 4,937,559 | A | * | 6/1990 | Meacham | F24F 13/22 200/61.04 |
| 5,522,229 | A | * | 6/1996 | Stuchlik, III | E03C 1/28 62/127 |
| 7,191,606 | B1 | * | 3/2007 | Dwyer | F24F 13/222 62/150 |
| 8,572,991 | B2 | * | 11/2013 | Arensmeier | F24F 13/222 340/620 |
| 9,285,802 | B2 | | 3/2016 | Arensmeier | |
| 9,631,833 | B2 | * | 4/2017 | Arensmeier | F24F 13/222 |

(Continued)

OTHER PUBLICATIONS

Product information for Condensate Detection Switches, DiversITech Corporation, retrieved from https://www.diversitech.com/category/cat_id/230.

(Continued)

*Primary Examiner* — Joseph H Feild
*Assistant Examiner* — Rufus C Point
(74) *Attorney, Agent, or Firm* — Armstrong Teasdale LLP

(57) ABSTRACT

A system and a method of detecting a condensate line blockage in an air conditioning unit includes receiving a call for cooling indication from a thermostat associated with the air conditioning unit and detecting a pattern of a plurality of loss of power (LOP) to the air conditioning unit events, the LOP events caused by a trip of a condensate drain line switch. The method also includes analyzing the detected pattern for at least one of a frequency of LOP events in a predetermined time period and an elapsed time between successive LOP events, and initiating a condensate line blockage alert when the analyzed pattern meets predetermined condensate line blockage criteria.

20 Claims, 9 Drawing Sheets

(56) References Cited

U.S. PATENT DOCUMENTS

| | | | |
|---|---|---|---|
| 2005/0138939 A1* | 6/2005 | Spanger | F24F 13/222 62/150 |
| 2007/0063856 A1* | 3/2007 | Gibson | F22B 37/50 340/608 |
| 2011/0061415 A1* | 3/2011 | Ward | F04B 49/04 62/291 |
| 2012/0017611 A1 | 1/2012 | Coffel et al. | |
| 2012/0158188 A1* | 6/2012 | Madala | G01F 23/243 700/276 |
| 2012/0221150 A1* | 8/2012 | Arensmeier | G05B 23/0224 700/276 |
| 2013/0085688 A1* | 4/2013 | Miller | G01F 1/66 702/48 |
| 2014/0262134 A1* | 9/2014 | Arensmeier | F24D 19/1084 165/11.2 |
| 2014/0266755 A1* | 9/2014 | Arensmeier | G05B 15/02 340/679 |
| 2015/0315803 A1* | 11/2015 | Hamza | E04H 4/12 4/509 |
| 2015/0362207 A1 | 12/2015 | Abiprojo et al. | |
| 2016/0002842 A1* | 1/2016 | Dawes | G05D 9/12 137/398 |
| 2016/0284193 A1* | 9/2016 | Davis | G01M 3/16 |

OTHER PUBLICATIONS

Savage, Robert, "HVAC Overflow Flood Detection and Preventative Shutdown," article posted on Oct. 12, 2013 on savage.home.automation website at http://www.savagehomeautomation.com/projects/hvac-overflow-flood-detection-and-preventative-shutdown.html.

Product information for Condensate Overflow Control Products, RectorSeal, retrieved from http://www.rectorseal.com/condensate-overflow-control-products/.

* cited by examiner

SYSTEM AND METHOD FOR THERMOSTAT DETECTION OF CONDENSATE SWITCH TRIPPING

FIELD

The field of the disclosure relates generally to equipment monitoring systems, and, more particularly, to detection of fluid line blockage.

BACKGROUND

Loss of cooling or heating in heating and ventilating systems due to condensate drain blockages and subsequent tripping of a condensate switch is a regular occurrence during operation. Often this results in a service call and onsite diagnostics for what is a simple and usually easily resolved problem. Remediation is possible by a low-level technician or the home owner, especially if intervention is early. Often in the initial stages of a condensate drain blockage interruptions are cyclic as the drain is slow, but not completely blocked.

Prior solutions include direct monitoring of the condensate switch and alarms are available, but require additional hardware to be installed, which is beyond the capabilities of a typical homeowner and therefore means increased expense for the added protection that switch monitoring can provide.

The prior art consists of electro-mechanical or electronic switches which are added to the condensate pan or drain tube, and interrupt the signal from the thermostat if a high-water condition is detected in either. These switches can be included in a circuit containing an audible alarm which is activated if a flooded pan is detected.

The prior art also discloses diagnostic systems which monitor the condition of a variety of components in a heating, ventilation, and air conditioning (HVAC) system by monitoring the control line current to one or more of the components.

BRIEF SUMMARY

In one aspect, a method of detecting a condensate line blockage in an air conditioning unit includes receiving a call for cooling indication from a thermostat associated with the air conditioning unit and detecting a pattern of a plurality of loss of power (LOP) to the air conditioning unit events, the LOP events caused by a trip of a condensate drain line switch. The method also includes analyzing the detected pattern for at least one of a frequency of LOP events in a predetermined time period and an elapsed time between successive LOP events, and initiating a condensate line blockage alert when the analyzed pattern meets predetermined condensate line blockage criteria.

In another aspect, a temperature control system includes at least one temperature sensor for use in sensing an air temperature of a conditioned space, a call for cooling relay configured to generate a call for cooling indication signal, and a power monitoring circuit. The power monitoring circuit includes at least one of a loss of power (LOP) event counter and a variance over a moving time window analyzer. The loss of power (LOP) event counter including a power monitoring circuit input terminal and a call for cooling input terminal communicatively coupled to a counting circuit. The LOP event counter is configured to generate at least one of a frequency of LOP events and an elapsed time between a call for cooling and an LOP event. The variance over a moving time window analyzer includes a moving time window generator and an elapsed time clock. The temperature control system also includes a processing system communicatively coupled to the power monitoring circuit, the at least one temperature sensor, and the call for cooling relay. The processing system is configured to receive a call for cooling indication from a thermostat associated with the air conditioning unit and detect a pattern of a plurality of loss of power (LOP) to the air conditioning unit events wherein the LOP events are caused by a trip of a condensate drain line switch. The processing system is also configured to analyze the detected pattern for at least one of a frequency of LOP events in a predetermined time period and an elapsed time between successive LOP events, and initiate a condensate line blockage alert when the analyzed pattern meets predetermined condensate line blockage criteria.

In yet another aspect, a fluid conduit blockage detection system includes a fluid conduit, a switch positioned to detect at least one of a flow of fluid in the fluid conduit and a level of fluid in the fluid conduit. The switch is coupled to a device that generates a fluid that flows through the fluid conduit. The switch is operative to shut down the device when at least one of the flow of fluid is outside a predetermined flow range and the level of fluid in the fluid conduit exceeds a predetermined level range. The fluid conduit blockage detection system also includes a controller configured to monitor a position of the switch and a call for operation of the device and to determine a pattern of switch tripping versus the call for operation of the device. The controller is further configured to transmit a prediction of a blockage of the fluid conduit based on the pattern of switch tripping.

BRIEF DESCRIPTION OF THE DRAWINGS

FIG. 1 is a block diagram of a heating, ventilation, and air conditioning (HVAC) system for a structure in accordance with an example embodiment of the present disclosure.

FIG. 2 is a side elevation diagram of a portion of HVAC system shown in FIG. 1.

FIG. 3 is a schematic diagram of a control power supply circuit to the HVAC system shown in FIG. 1 showing the condensate drain line switch positioned in the "R" line to thermostat.

FIG. 4 is a schematic diagram of control power supply to HVAC system shown in FIG. 1 showing the condensate drain line switch positioned in the "Y" line to the thermostat.

FIG. 5 is a schematic diagram of control power supply to the HVAC system shown in FIG. 1 showing the condensate drain line switch positioned in the "C" line to the thermostat.

FIG. 6 shows a plurality of traces related to four cooling demand cycles on HVAC system.

FIG. 7 shows the plurality of traces shown in FIG. 6 responding to a condition where HVAC system is suffering from a plurality of trips of condensate drain line switch and the consequential shutting down of HVAC system during a call for cooling.

FIG. 8 is a control system diagram implementing an example embodiment of a mis-count method of predicting blockage in the condensate drain line condensate drain line.

FIG. 9 is a control system diagram implementing an example embodiment of a coefficient of variance (COV) method of predicting blockage in the condensate drain line condensate drain line.

FIG. 10 is a flow chart of a method of detecting a condensate line blockage in an air conditioning unit.

Figure 1:
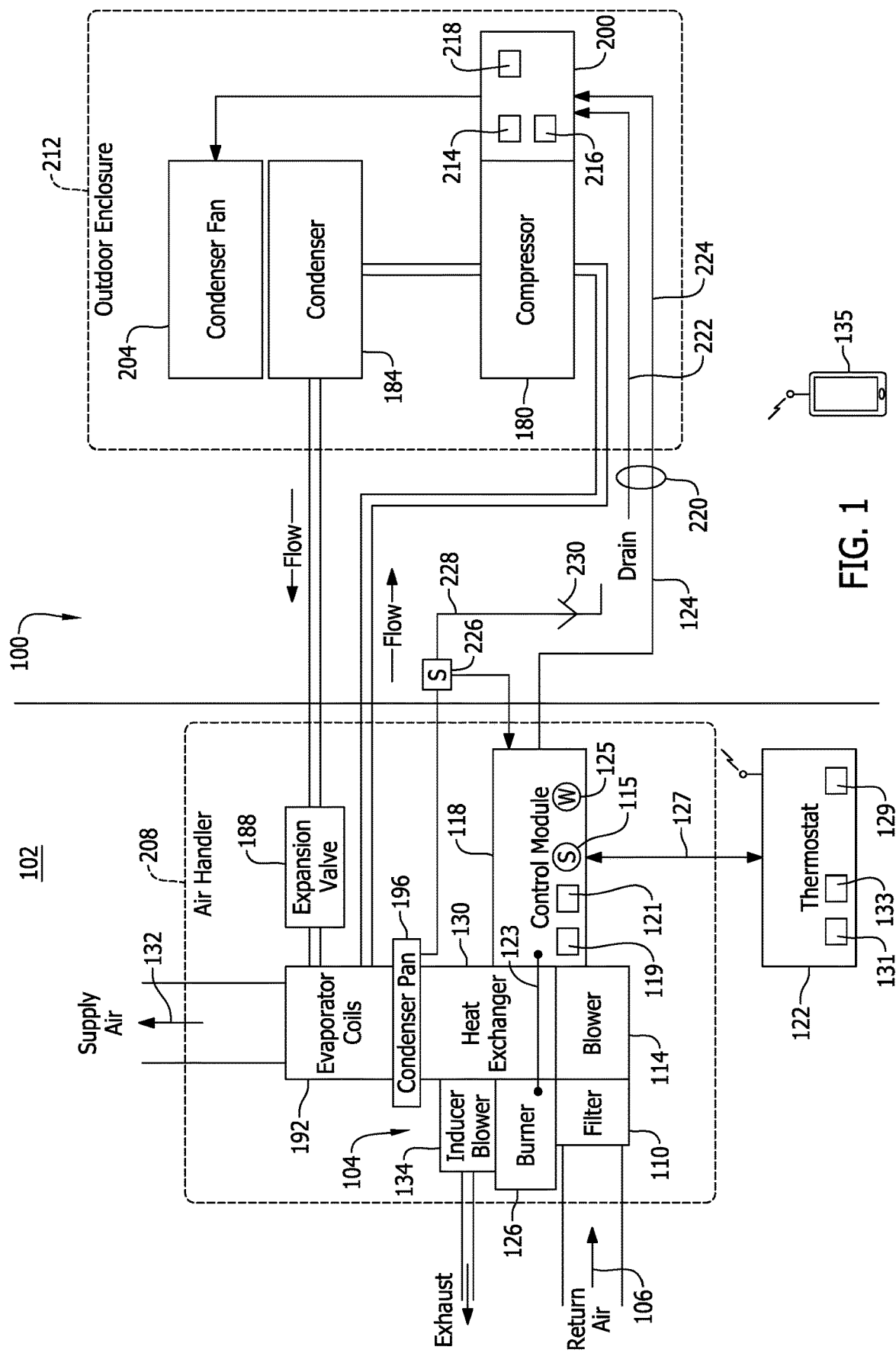
FIGS. 1-10 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to analytical and methodical embodiments of detecting partial fluid line blockages in industrial, commercial, and residential applications.

Embodiments of heating, ventilation, and air conditioning (HVAC) systems with air conditioning and a connected thermostat are described herein. HVAC thermostats may include power monitoring circuitry. In various embodiments, this power monitoring circuitry is used in analyses of the HVAC system data in a manner that is not well understood, routine, and/or conventional in the relevant art. The power monitoring circuitry and other sensors, such as, but not limited to, a condensate drain line switch may be used together to infer a scenario that is not directly monitored. For example, power interruptions may occur with some regularity after a call for cool or heat. Power interruptions may present as an interruption of power to the whole HVAC control system, i.e. loss of "R" or loss of a connection to "Y" or "W" depending on where the condensate drain line switch is installed. All condensate drain line switches would be monitored for an indication of a condensate switch opening. A frequency of power interruptions occurring in a moving time window and/or a calculation of a constancy of a timing of the power interruptions may be used to determine whether a condensate drain line monitored by the condensate drain line switch is plugging or becoming blocked. The calculation of a constancy of a timing of the power interruptions may be made several techniques including using a coefficient of variance (COV), which may be calculated using a ratio of the standard deviation over a time window of the timing of the power interruptions to the mean of the timing. Other methods of determining when the condensate drain line will become plugged based on the timing between LOP events may be used.

In various embodiments, a temperature control system includes at least one temperature sensor for use in sensing an air temperature of a conditioned space, a call for cooling relay configured to generate a call for cooling indication signal, and a power monitoring circuit. The power monitoring circuit includes at least one of a loss of power (LOP) event counter and a variance over a moving time window analyzer. The LOP event counter includes a power monitoring circuit input terminal and a call for cooling input terminal communicatively coupled to a counting circuit. The LOP event counter is configured to generate at least one of a frequency of LOP events and an elapsed time between a call for cooling and an LOP event. The variance over the moving time window analyzer includes a moving time window generator and an elapsed time clock. The temperature control system also includes a processing system communicatively coupled to the power monitoring circuit, the at least one temperature sensor, and the call for cooling relay. The processing system is configured to receive a call for cooling indication from a thermostat associated with the air conditioning unit, detect a pattern of a plurality of loss of power (LOP) to the air conditioning unit events, the LOP events caused by a trip of a condensate drain line switch, and analyze the detected pattern for at least one of a frequency of LOP events in a predetermined time period and an elapsed time between successive LOP events. The processing system is also configured to initiate a condensate line blockage alert when the analyzed pattern meets predetermined condensate line blockage criteria. The predetermined condensate line blockage criteria may include receiving a number of LOP events that exceeds a predetermined threshold while the call for cooling indication is present and/or a number of trips of the condensate drain line switch during the call for cooling exceeding a predetermined threshold in a predetermined period of time. The predetermined condensate line blockage criteria may optionally include a coefficient of variance of the LOP events during a predetermined period of time represented by a moving time window generated by the moving time window analyzer exceeds a predetermined threshold range. The power monitoring circuit and/or the processing system may form a part of the thermostat device or a part of an air handler portion of the air conditioning unit.

At least some of the steps in the methods described herein may be performed using computer devise having one or more processors and one or more memory devices. Instructions that are executable by the one or more processors may be stored in the memory devices and/or may be stored on "non-transitory computer-readable media."

The following description refers to the accompanying drawings, in which, in the absence of a contrary representation, the same numbers in different drawings represent similar elements.

Figure 2:
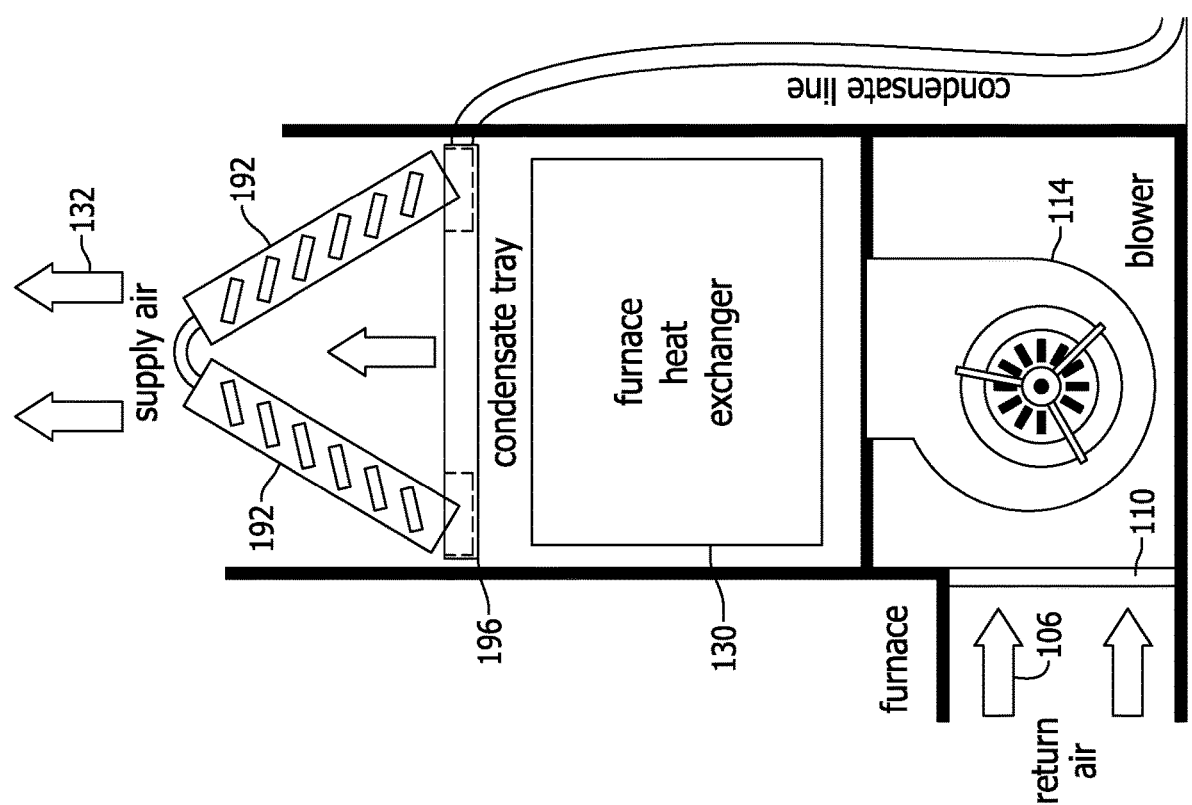

FIG. 1 is a block diagram of a heating, ventilation, and air conditioning (HVAC) system 100 for a structure 102 in accordance with an example embodiment of the present disclosure. FIG. 2 is a side elevation diagram of a portion of HVAC system 100 (shown in FIG. 1). In this particular example, a forced air system with a gas furnace 104 is shown. Return air 106 is pulled from structure 102 through a filter 110 by a blower 114. Blower 114, also referred to as a fan or circulator, is controlled by a "G" relay 115 and a control module 118. Control module 118 includes one or more processors 119 and one or more memory devices 121. A thermostat 122 includes one or more processors 131 and one or more memory devices 133. Control module 118 receives control signals 127 from thermostat 122. Thermostat 122 may include one or more temperature set points specified by a user through a user interface 129, which may be mounted on thermostat 122 or may be embodied in a mobile device 135, such as, but not limited to a smartphone.

Thermostat 122 may direct that blower 114 be turned on at all times or only when a heat request 123 or cool request 124 is present. Blower 114 may also be turned on at a scheduled time or on demand. In various embodiments, blower 114 can operate at multiple speeds or at any speed within a predetermined range. One or more switching relays 115 may be used to control blower 114 and/or to select a speed of blower 114.

Thermostat 122 also provides heat requests 123 and cool requests 124 to control module 118. When heat request 123 is made, control module 118 energizes a "W" relay 125, which initiates a heating sequence and causes a burner 126 to ignite. Heat from combustion is introduced to return air 106 provided by blower 114 in a heat exchanger 130. The heated air is supplied to structure 102 and is referred to as supply air 132.

Burner 126 may include a pilot light, which is a small constant flame for igniting the primary flame in burner 126. Alternatively, an intermittent pilot may be used in which a small flame is first lit prior to igniting the primary flame in burner 126. A sparker may be used for an intermittent pilot implementation or for direct burner ignition. Another ignition option includes a hot surface igniter, which heats a surface to a high enough temperature that when gas is introduced, the heated surface causes combustion to begin. Fuel for combustion, such as natural gas, may be provided by a gas valve (not shown).

Products of combustion 136 are exhausted outside of structure 102, and an inducer blower 134 may be turned on prior to ignition of burner 126 to facilitate movement of products of combustion 136 through furnace 104. Inducer blower 134 provides a draft to remove products of combustion 136 from burner 126. Inducer blower 134 may remain running while burner 126 is operating. In addition, Inducer blower 134 may continue running for a set period of time after burner 126 turns off. In a high efficiency furnace 104, products of combustion 136 may not be hot enough to have sufficient buoyancy to exhaust via conduction. Therefore, inducer blower 134 creates a draft to exhaust products of combustion 136.

A single enclosure, also referred to as an air handler 208, may include filter 110, blower 114, control module 118, burner 126, heat exchanger 130, inducer blower 134, expansion valve 188, evaporator 192, and condensate collection tray 196.

In the example embodiment, a split-type air conditioning system is shown. Refrigerant is circulated through a compressor 180, a condenser 184, an expansion valve 188, and an evaporator 192. Evaporator 192 is placed in series with supply air 132 so that when cooling is desired, evaporator removes heat from supply air 132, thereby cooling supply air 132. During cooling, evaporator 192 is cold, which causes water vapor to condense. This condensed water vapor, in the form of water, is collected in a condensate collection tray 196, which drains away from HVAC system 100 or is pumped out.

A compressor control module 200 receives a cool request 124 from control module 118 and controls compressor 180 accordingly. Compressor control module 200 also controls a condenser fan 204, which increases heat exchange between condenser 184 and outside air. In such a split system, compressor 180, condenser 184, compressor control module 200, and condenser fan 204 are located outside of structure 102, often in a single outdoor enclosure 212.

In various embodiments, compressor control module 200 may simply include a run capacitor 214, a start capacitor 216, and a contactor or relay 218. In fact, in certain implementations, start capacitor may be omitted, such as when a scroll compressor instead of a reciprocating compressor is being used. Compressor 180 may be a variable capacity compressor and may respond to a multiple-level cool request 124. For example, cool request 124 may indicate a mid-capacity call for cool or a high capacity call for cool.

Electrical lines 220 provided to outdoor enclosure 212 may include a 240 volt mains power line 222 and a 24 volt switched control line 224. 24 volt control line may correspond to cool request 124. 24 volt control line controls operation of contactor. When control line 224 indicates that compressor 180 should be on, contactor 218 contacts close, connecting 240 volt mains power line 222 to compressor 180. In addition, contactor may connect 240 volt mains power line 222 to condenser fan 204.

Monitoring of operation of components in HVAC system 100 may be performed by multiple discrete sensors placed locally where the component is located. In the example embodiment, a condensate drain line switch 226 is positioned in a condensate drain line 228 that runs from condensate pan 194 to a floor drain 230 or to the ground outside of structure 102. In one embodiment, condensate drain line switch 226 is operative to open a control line between thermostat 122 and control module 118 when condensate drain line switch 226 detects condensate backing up in condensate drain line 228. Condensate drain line switch 226 may be embodied in a float switch, conductivity switch, or other type switch that is influenced by a fluid level change, for example, a capacitance or inductance sensor connected to a switch device. In some embodiments, condensate drain line switch 226 is operatively coupled directly to thermostat 122. In other embodiments, condensate drain line switch 226 is operatively coupled to thermostat 122 through control module 118.

During operation, condensate formed on evaporator coils 192 is collected in condensate collection tray 196. The condensate is directed to a condensate drain line 228 where the condensate flows away from condensate collection tray 196 to drain 230 or to the ground. Over time, condensate drain line 228 may accumulate debris or biological growth, which tends to narrow the flow passage for the condensate. At some point, the amount of condensate being generated on evaporator coils 192 exceeds the flow capacity of the narrowed condensate drain line 228 and condensate drain line 228 begins filling with condensate. When the condensate level in condensate drain line 228 builds to the position of condensate drain line switch 226, condensate drain line switch 226 trips one or more of a plurality of control signals 232 to stop the operation of HVAC system 100. Stopping the operation of HVAC system 100 ceases generation of condensate. The condensate in condensate drain line 228 is then able to lower below the position of condensate drain line switch 226 if condensate drain line 228 is not completely blocked. When the level of condensate in condensate drain line 228 lowers below the position of condensate drain line switch 226 plus a deadband of condensate drain line switch 226, HVAC system 100 is permitted to restart, resuming cooling and condensate generation.

Typically, "G" line 115 of thermostat 122 controls a fan relay and is responsible for turning blower fan 114 on and off automatically or manually via thermostat 122. An "RC" line supplies 24-volt cooling power. An "RH" line supplies 24-volt heating power. In some embodiments, the "RC" and "RH" are coupled together forming a single "R" line (as will be shown in FIG. 3) to supply power to all control relays. A "Y" line is used to control cooling contactor 218. When the thermostat calls for cooling, power is fed to pull in cooling contactor 218 and the fan relay powering condenser 184 and blower fan 114 thereby cooling structure 102. A "W/B" line controls a heat relay. When thermostat 122 calls for heat, power is fed to pull in the heat relay and the fan relay powering furnace 104 and blower fan 114 thereby heating structure 102. A "Y1" line is used for the compressor contact in a heat pump application. Because generating condensate is a result of cooling vapor laden return air 106, turning off the heating relay or heating power is not applicable. Accordingly, condensate drain line switch 226 may affect an opening of "G," "R," "Y/O," and "Y1" lines to secure cooling when condensate drain line 228 begins filling.

In the example embodiment, several time periods may be defined to facilitate determining an imminent trip of condensate drain line switch 226 and/or plugging of condensate drain line 228. For example, a time between tripping and resetting of condensate drain line switch 226 provides valuable information related to the generation of condensate and the capability of draining the condensate away from HVAC system 100. Other time periods between actuation and resetting of condensate drain line switch 226 are analyzed as described in detail below to indicate a partially blocked condensate drain line 228 and to predict an approximate time to complete blockage.

Figure 3:
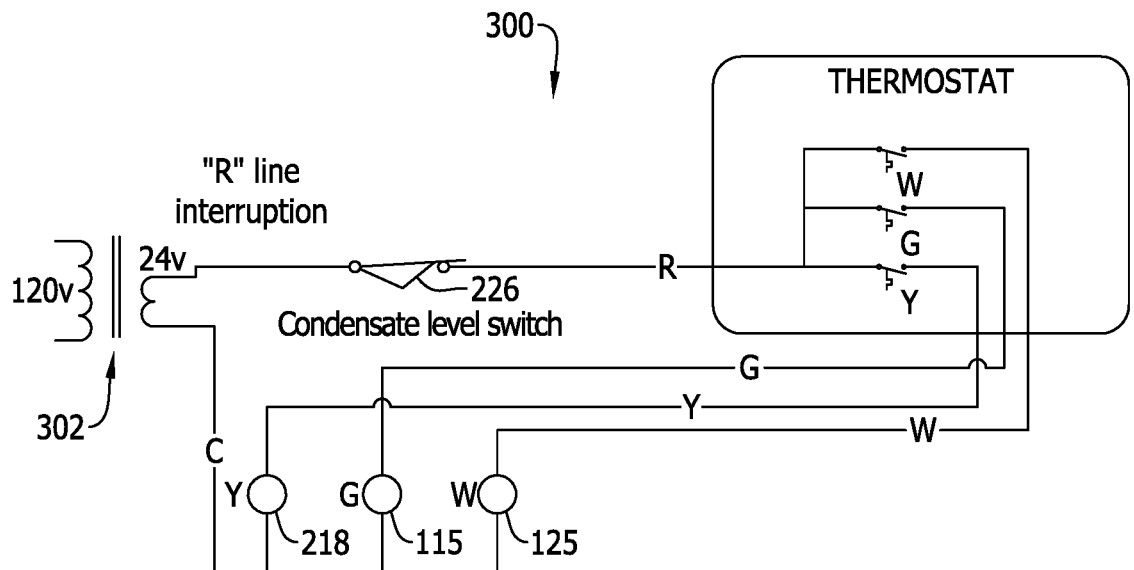
Figure 4:
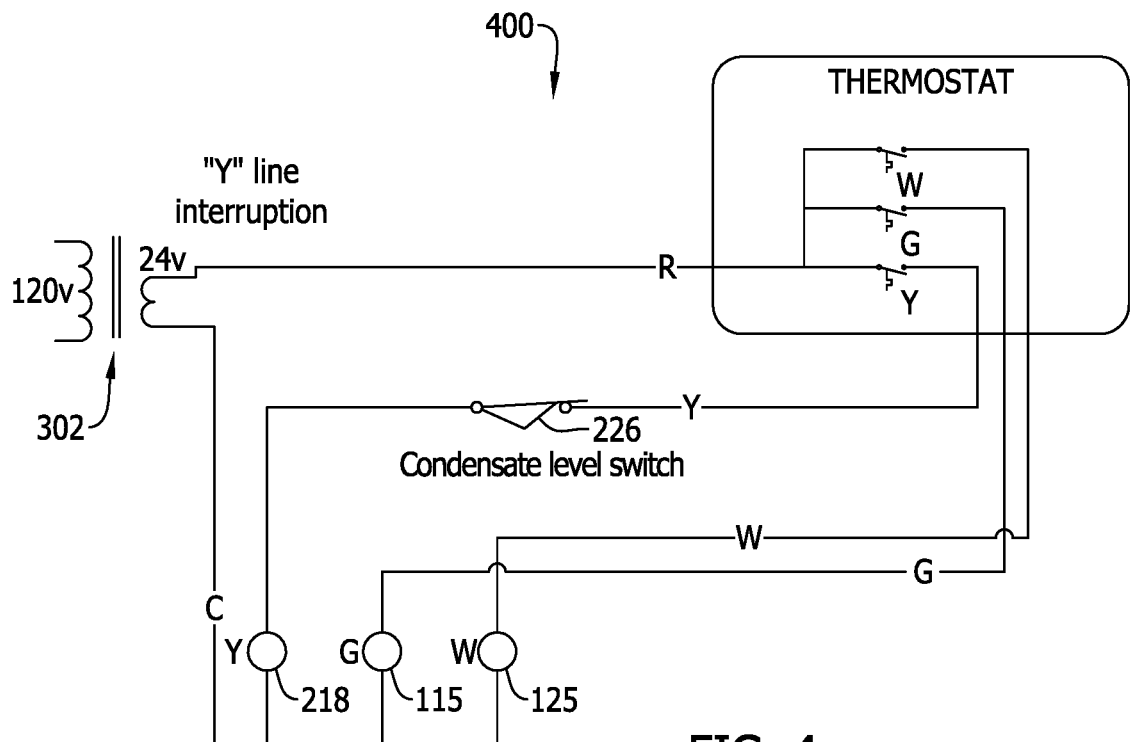
Figure 5:
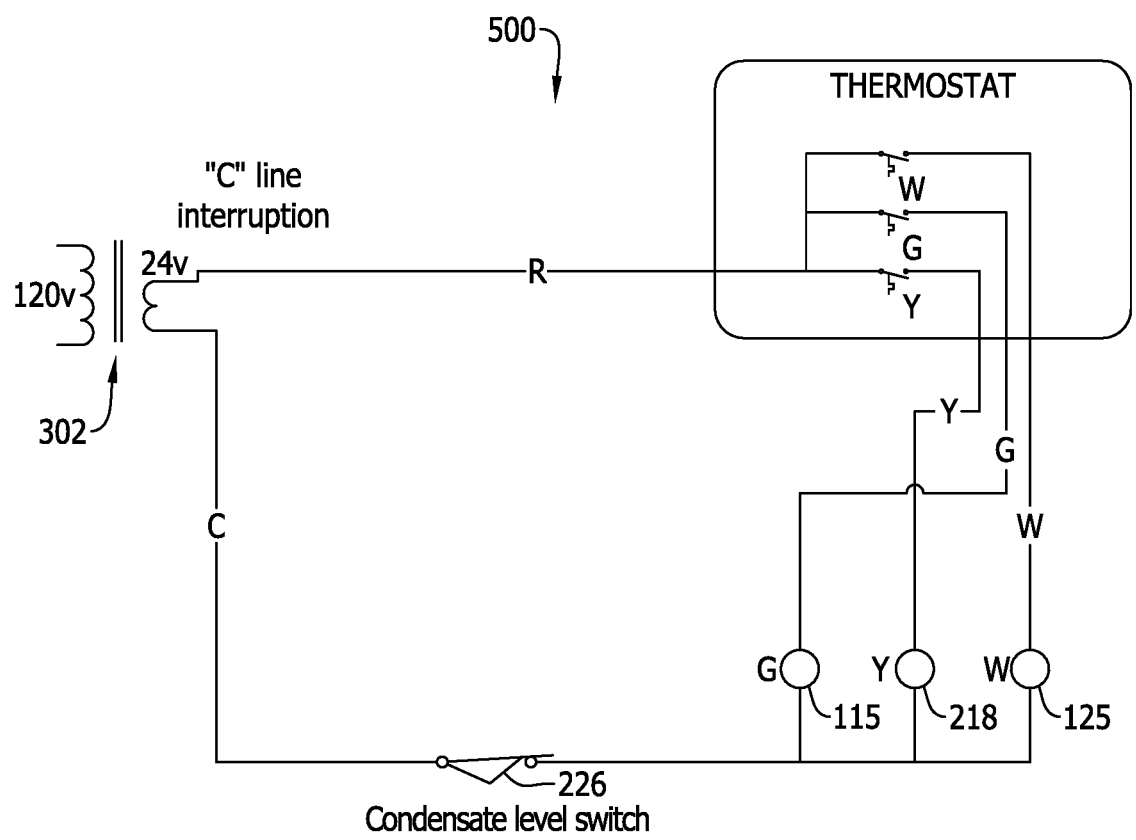

FIG. 3 is a schematic diagram of control power supply circuit 300 to HVAC system 100 (shown in FIG. 1) showing condensate drain line switch 226 positioned in the "R" line to thermostat 122. FIG. 4 is a schematic diagram of control power supply to HVAC system 100 (shown in FIG. 1) showing condensate drain line switch 226 positioned in the "Y" line to thermostat 122. FIG. 5 is a schematic diagram of control power supply to HVAC system 100 (shown in FIG. 1) showing condensate drain line switch 226 positioned in the "C" line to thermostat 122. In the example embodiments, a control power transformer 302 receives 120 VAC mains power and supplies 24 VDC control power to HVAC system 100. In the embodiment of FIG. 3, condensate drain line switch 226 is configured to interrupt the "R" line, which interrupts power to the relays controlled by thermostat 122, for example, cooling contactor 218, fan relay 115, and heat relay "W" 125. Interrupting power to cooling contactor 218 prevents compressor 180 and condenser fan 204 from operating, which ceases cooling and the generation of condensate. Interrupting power to fan relay 115 prevents blower 114 from operating, which indirectly ceases cooling and the generation of condensate. Interrupting power to heat relay "W" 125 prevents ignition of burner 126 and operation of the heating components of HVAC system 100.

In the embodiment of FIG. 4, condensate drain line switch 226 is configured to interrupt the "Y" line, which interrupts power to cooling contactor 218, while fan relay 115 and heat relay "W" 125 remain under the control of thermostat 122. In the embodiment of FIG. 5, condensate drain line switch 226 is configured to interrupt the "C" line, or 24 VAC common line, which like the "R" line configuration interrupts power to all the relays controlled by thermostat 122.

Figure 6:
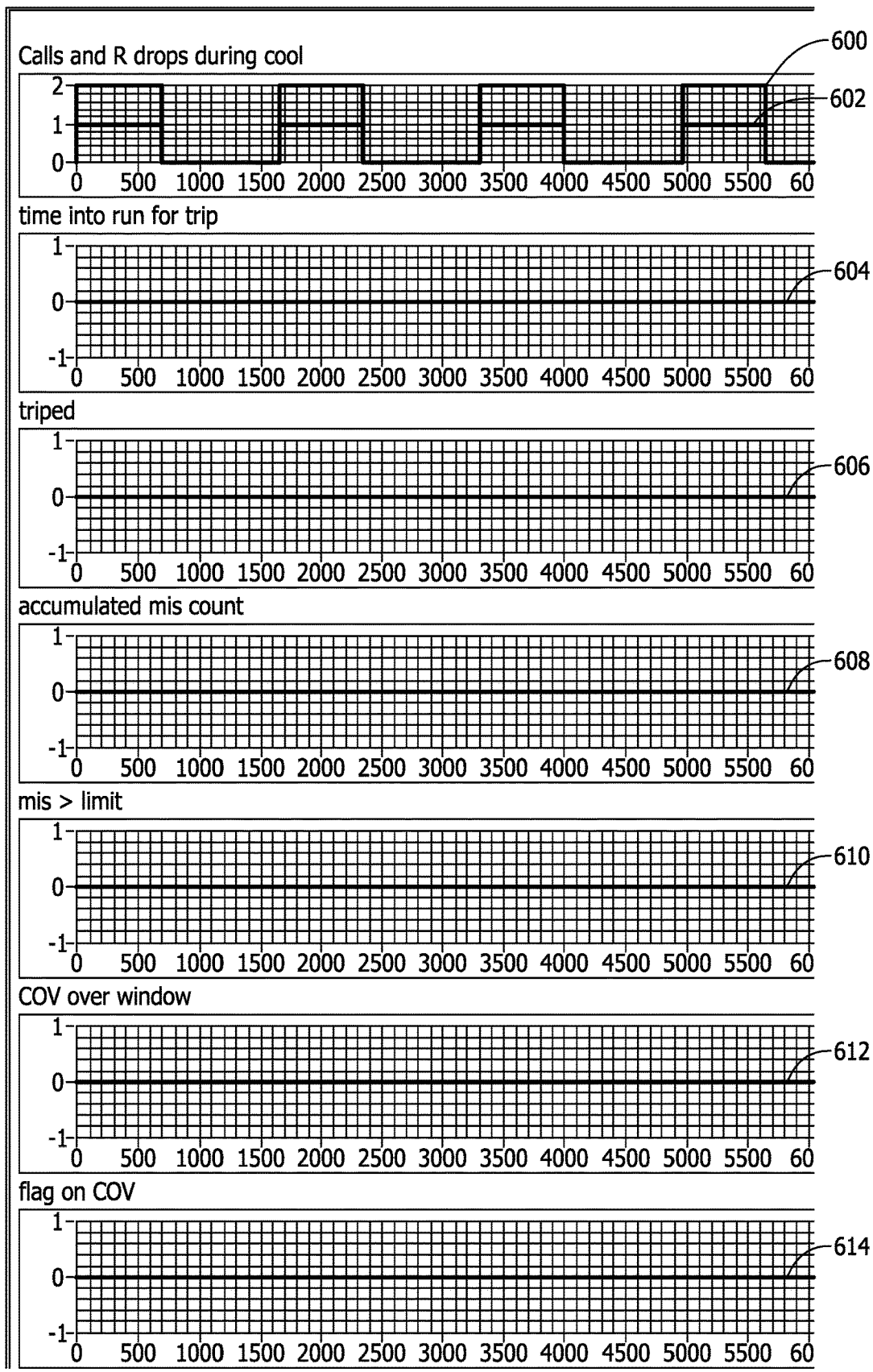

FIG. 6 shows a plurality of traces related to four cooling demand cycles on HVAC system 100. In the example embodiment, condensate drain line switch 226 is positioned in the "R" line of thermostat 122. A first trace 600 illustrates a call for cooling by thermostat 122 and a trace 602 of a cool running response of HVAC system 100. In the example embodiment, call for cooling trace 600 and cool running trace 602 coincide temporally when condensate drain line switch 226 is not tripped and condensate drain line 228 is not plugged or partially blocked. Therefore, traces 600 and 602 show the normal operation of HVAC system 100 when condensate drain line 228 is not plugged or blocked. A third trace 604 indicates an amount of time for condensate drain line switch 226 to trip. Trace 606 is an indicator of how fast condensate drain line 228 is filling up, which is an indicator of how badly condensate drain line 228 is plugged.

A fourth trace 606 shows a binary value that indicates a tripped or non-tripped state of condensate drain line switch 226. A fifth trace 608 shows an accumulated "mis-count" of condensate drain line switch 226. Mis-count represents a trip count or misses over a predetermined or selectable time window. A sixth trace 610 represents when the mis-count exceeds a threshold range in the predetermine period of time. A seventh trace 612 represents a coefficient of variation (COV) is a measure of relative variability of the monitored parameter. In some embodiments, COV is a ratio of a standard deviation to a mean (average) of the monitored parameter. The COV over a time window indicates a level of consistency in the time into the run for a trip of condensate drain line switch 226. An eighth trace 614 flags when the COV is greater than a predetermined threshold range.

Figure 7:
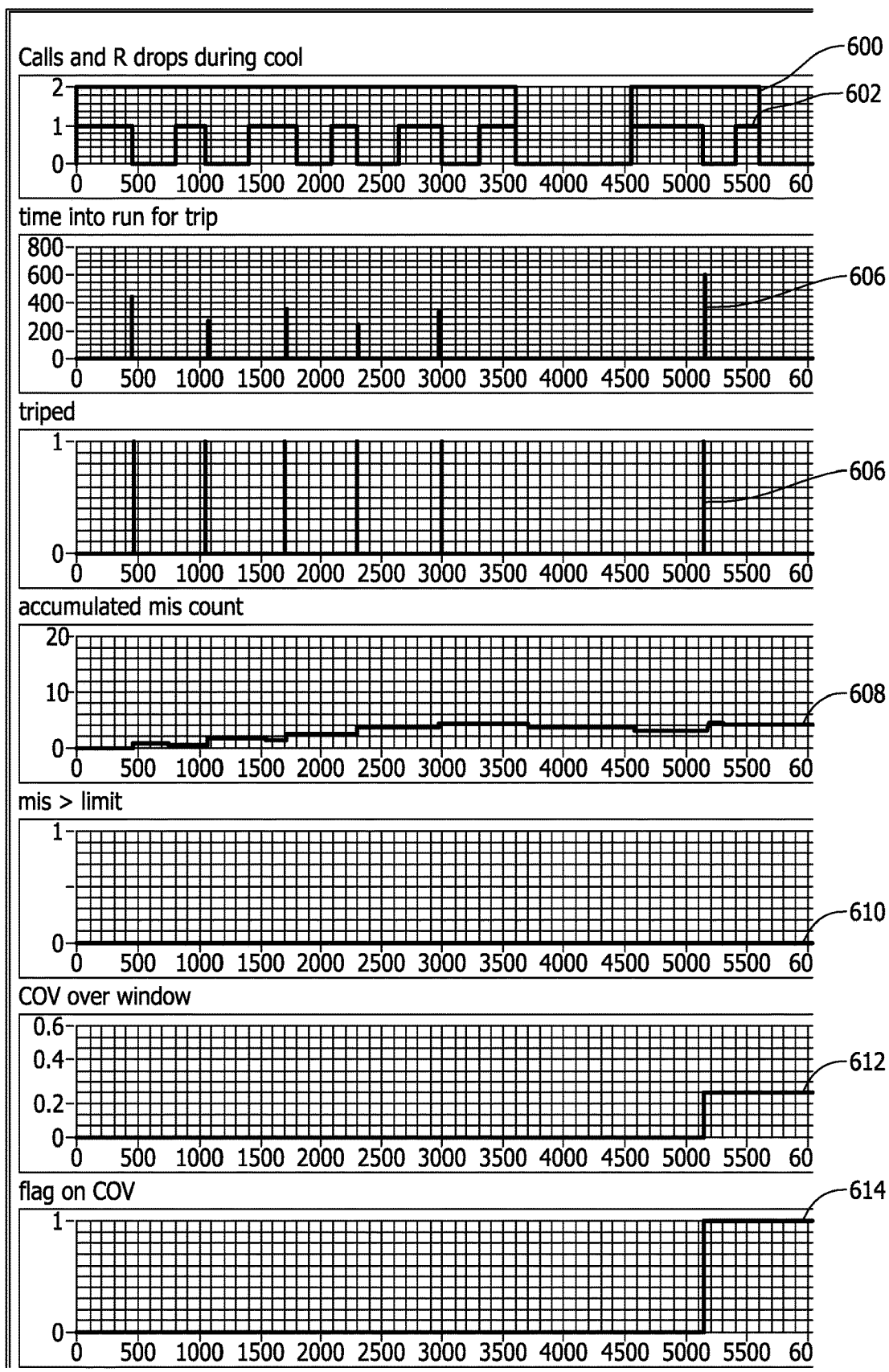

FIG. 7 shows the plurality of traces shown in FIG. 6 responding to a condition where HVAC system 100 is suffering from a plurality of trips of condensate drain line switch 226 and the consequential shutting down of HVAC system 100 during a call for cooling. In the scenario depicted by FIG. 7, trace 600 shows a call for cooling at $t_0$. HVAC system 100 responds by initiating a cooling cycle illustrated by trace 602, however, at approximately $t_{450}$, condensate drain line switch 226 trips, shutting down at least a portion of HVAC system 100, which suspends condensate formation, giving condensate drain line 228 time to drain, if it is not completely blocked. When condensate drain line switch 226 resets at approximately $t_{800}$, HVAC system 100 is restarted, which also recommences condensate generation, which tends to fill line condensate drain line 228 again. At $t_{1080}$, condensate drain line switch 226 trips again. At approximately $t_{3600}$, the call for cooling ceases and the cool running illustrated by trace 602 stops. The cycle resumes when a call for cooling is again initiated at approximately $t_{4550}$.

At approximately $t_{450}$, trace 604 indicates the time into the run when condensate drain line switch 226 trips, which is also shown by trace 602. The relative heights of the peaks of trace 604 are used by trend analysis components to predict when condensate drain line switch 226 will trip next and when condensate drain line 228 will plug completely. Learning algorithms analyze the trend and use pattern recognition in the predictions. Trace 606 shows each trip of condensate drain line switch 226 with a peak value of trace 606. A number of peak values of trace 606 per predetermined unit of time or a time between peaks is also used as a predictor of a future plugged condensate drain line 228. Trace 608 shows an increase in magnitude at each trip of condensate drain line switch 226. The increases in magnitude correspond temporally to the trips of condensate drain line switch 226 shown by trace 606. If the magnitude of trace exceeds a predetermined threshold or setpoint, trace 610 will increase a corresponding amount at the same elapsed time the excess occurs. Coefficient of Variation (COV) is also used to predict imminent trips of condensate drain line switch 226 or complete plugging of condensate drain line 228 is shown by trace 612. Trace 614 shows when a COV flag is set. When trace 614 goes high as shown at approximately $t_{5150}$, a flag may be set, which can be used to alert a user or to initiate an automatic system response.

Figure 8:
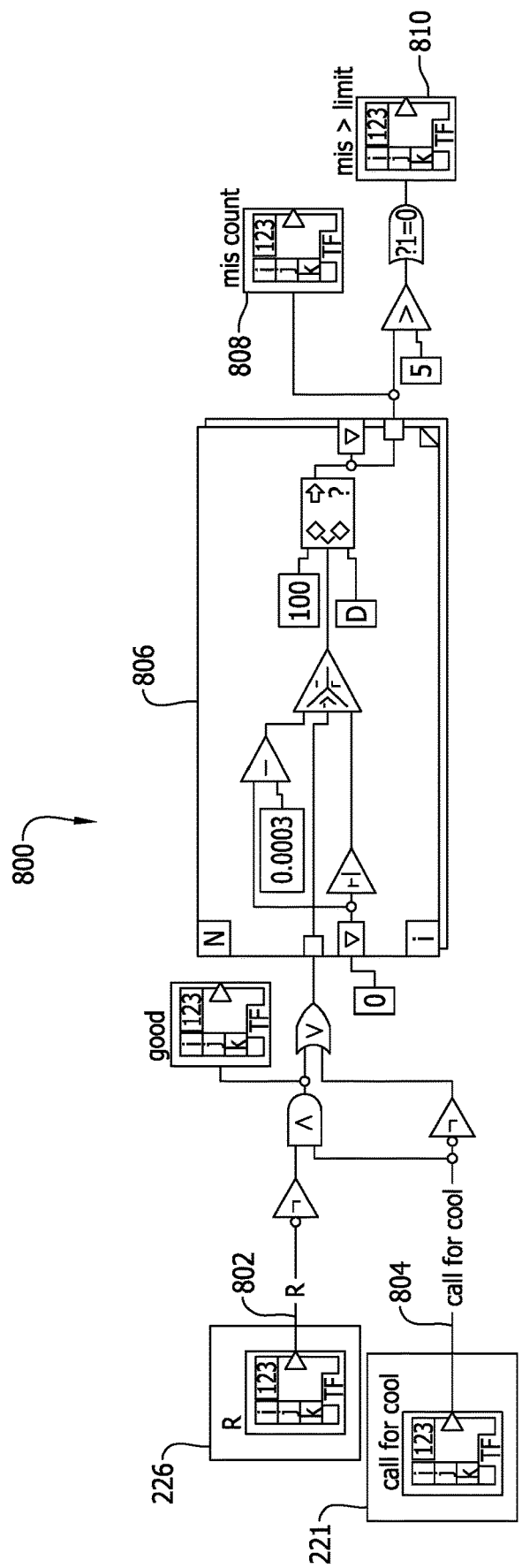

FIG. 8 is a control system diagram implementing an example embodiment of a mis-count method 800 of predicting blockage in condensate drain line condensate drain line 228. In the example embodiment, mis-count method 800 receives as inputs, a status 802 of condensate drain line switch 226, "R" and a call for cooling status 804. A controller 806, such as, but not limited to control module 118 analyzes status 802 of condensate drain line switch 226, "R" and call for cooling status 804 to determine when condensate drain line switch 226 trips during a call for cooling. Other parameters associated with the operation of thermostat 122 and HVAC system 100 may also be analyzed for as described above. Controller 806 displays an indication 808 of mis-count and an indication 810 of mis-count exceeding a predetermined threshold range. Indication 808 of mis-count and an indication 810 of mis-count exceeding a predetermined threshold range may be displayed locally or remotely, or may be transmitted to downstream components for further analyses and control.

Figure 9:
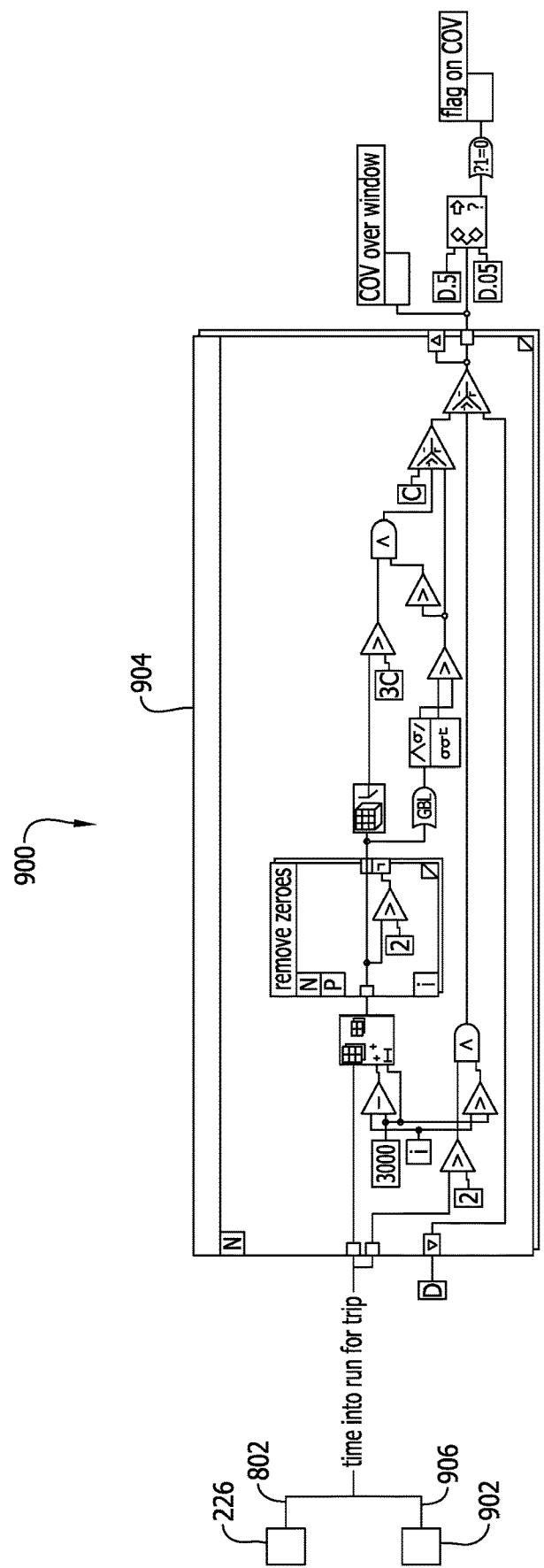

FIG. 9 is a control system diagram implementing an example embodiment of a coefficient of variance (COV) method 900 of predicting blockage in condensate drain line condensate drain line 228. COV method 900 uses condensate drain line switch 226 and a counter, such as, but not limited to an elapsed time counter 902 monitors a time period from when HVAC system 100 is in operation until a trip of condensate drain line switch 226 occurs. COV method 900 also monitors a time period between when condensate drain line switch 226 trips and when condensate drain line switch 226 resets and HVAC system 100 begins operating again. A controller 904, such as, but not limited to control module 118 analyzes status 802 of condensate drain line switch 226, "R" and an elapsed time value 906 from elapsed time counter 902 to generate a COV over window output 908 and a COV over window flag output 910.

Figure 10:
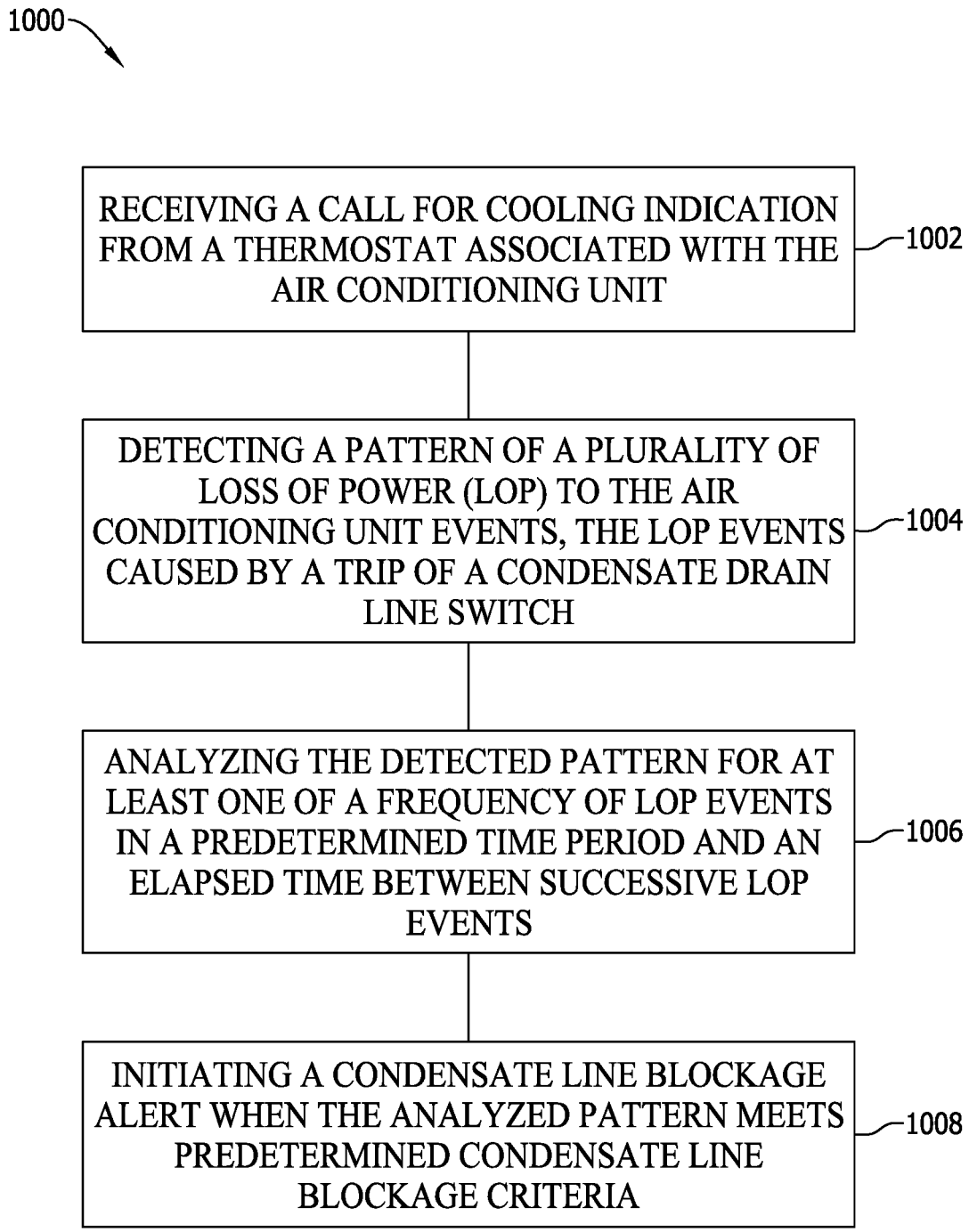

FIG. 10 is a flow chart of a method 1000 of detecting a condensate line blockage in an air conditioning unit. In the example embodiment, method 1000 includes receiving 1002 a call for cooling indication from a thermostat associated with the air conditioning unit, detecting 1004 a pattern of a plurality of loss of power (LOP) to the air conditioning unit events, the LOP events caused by a trip of a condensate drain line switch, and analyzing 1006 the detected pattern for at least one of a frequency of LOP events in a predetermined time period and an elapsed time between successive LOP events. Method 1000 also includes initiating 1008 a condensate line blockage alert when the analyzed pattern meets predetermined condensate line blockage criteria. Method 1000 optionally includes detecting a pattern of a plurality of restoration of power (ROP) to the air conditioning unit events wherein the ROP events are caused by a reset of the condensate drain line switch. Method 1000 also optionally includes storing at least one of the detected pattern of LOP events and the detected pattern of ROP events in one or more memory devices communicatively coupled to the thermostat. Method 1000 may optionally include starting a timer upon receipt of the call for cooling indication, detecting a current elapsed time to a loss of power (LOP) to the air conditioning unit event, detecting a current elapsed time to a restoration of power (ROP) to the air conditioning unit event, and receiving historical air conditioning unit data including a plurality of historical elapsed times for at least one of historical LOP and ROP events.

Method 1000 optionally includes detecting an increasing or decreasing frequency of LOP events between each call for cooling indication and the predetermined time period. Method 1000 may further include detecting a pattern of a plurality of ROP events, the ROP events caused by a reset of a condensate drain line switch, analyzing the detected pattern for at least one of a frequency of ROP events in a predetermined time period and an elapsed time between successive ROP events, and initiating a condensate line blockage alert when the analyzed pattern meets predetermined condensate line blockage criteria. Method 1000 optionally includes detecting an increasing elapsed time period between an SOP event and a next subsequent ROP event.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device.

Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 119, 131 and by devices that include, without limitation, mobile devices 135, clusters, personal computers, workstations, clients, and servers, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, the technical effect of the methods and systems may be achieved by performing at least one of the following steps: (a) receiving a call for cooling indication from a thermostat associated with the air conditioning unit, (b) detecting a pattern of a plurality of loss of power (LOP) to the air conditioning unit events, the LOP events caused by a trip of a condensate drain line switch, (c) analyzing the detected pattern for at least one of a frequency of LOP events in a predetermined time period and an elapsed time between successive LOP events, and (d) initiating a condensate line blockage alert when the analyzed pattern meets predetermined condensate line blockage criteria. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of detecting a condensate line blockage in an air conditioning unit, said method comprising:
   receiving a call for cooling indication from a thermostat associated with the air conditioning unit;
   detecting a pattern of a plurality of loss of power (LOP) to the air conditioning unit events, the plurality of LOP events caused by a trip of a condensate drain line switch;
   analyzing the detected pattern for at least one of a frequency of LOP events in a predetermined time period and an elapsed time between successive LOP events; and initiating a condensate line blockage alert when the analyzed pattern meets predetermined condensate line blockage criteria.

2. The method of claim 1, further comprising detecting a pattern of a plurality of restoration of power (ROP) to the air conditioning unit events, the plurality of ROP events caused by a reset of the condensate drain line switch.

3. The method of claim 2, further comprising storing at least one of the detected pattern of LOP events and the detected pattern of ROP events in one or more memory devices communicatively coupled to the thermostat.

4. The method of claim 1, further comprising:
starting a timer upon receipt of the call for cooling indication;
detecting a current elapsed time to a loss of power (LOP) to the air conditioning unit event;
detecting a current elapsed time to a restoration of power (ROP) to the air conditioning unit event; and
receiving historical air conditioning unit data including a plurality of historical elapsed times for at least one of historical LOP and ROP events.

5. The method of claim 4, wherein analyzing the detected pattern for at least one of a frequency of LOP events in a predetermined time period and an elapsed time between successive LOP events comprises detecting an increasing frequency of LOP events between each call for cooling indication and the predetermined time period.

6. The method of claim 4, wherein analyzing the detected pattern for at least one of a frequency of LOP events in a predetermined time period and an elapsed time between successive LOP events comprises detecting a decreasing elapsed time between each call for cooling indication and the next LOP event.

7. The method of claim 4, further comprising:
detecting a pattern of a plurality of ROP events, the ROP events caused by a reset of a condensate drain line switch;
analyzing the detected pattern for at least one of a frequency of ROP events in a predetermined time period and an elapsed time between successive ROP events; and
initiating a condensate line blockage alert when the analyzed pattern meets predetermined condensate line blockage criteria.

8. The method of claim 7, wherein analyzing the detected pattern for at least one of a frequency of ROP events in a predetermined time period and an elapsed time between successive ROP events comprises detecting an increasing elapsed time period between an SOP event and a next subsequent ROP event.

9. A temperature control system comprising:
at least one temperature sensor for use in sensing an air temperature of a conditioned space;
a call for cooling relay configured to generate a call for cooling indication signal;
a power monitoring circuit comprising at least one of:
a loss of power (LOP) event counter comprising a power monitoring circuit input terminal and a call for cooling input terminal communicatively coupled to a counting circuit, the LOP event counter configured to generate at least one of a frequency of LOP events and an elapsed time between a call for cooling and an LOP event; and
a variance over a moving time window analyzer comprising a moving time window generator and an elapsed time clock; and a processing system communicatively coupled to the power monitoring circuit, the at least one temperature sensor, and the call for cooling relay, the processing system configured to:
receive a call for cooling indication from a thermostat associated with the air conditioning unit;
detect a pattern of a plurality of loss of power (LOP) to the air conditioning unit events, the LOP events caused by a trip of a condensate drain line switch;
analyze the detected pattern for at least one of a frequency of LOP events in a predetermined time period and an elapsed time between successive LOP events; and
initiate a condensate line blockage alert when the analyzed pattern meets predetermined condensate line blockage criteria.

10. The temperature control system of claim 9, further comprising a thermostat device, at least one of the power monitoring circuit and the processing system form a part of the thermostat device.

11. The temperature control system of claim 9, wherein the variance over a moving time window analyzer comprises a ratio of a standard deviation to a mean of a plurality of LOP events during a time period covered by a moving time window generated by the moving time window analyzer.

12. The temperature control system of claim 9, wherein the predetermined condensate line blockage criteria comprises a coefficient of variance of the LOP events during a predetermined period of time represented by a moving time window generated by the moving time window analyzer exceeds a predetermined threshold range.

13. The temperature control system of claim 9, wherein the predetermined condensate line blockage criteria comprises receiving a number of LOP events that exceeds a predetermined threshold while the call for cooling indication is present.

14. The temperature control system of claim 9, wherein the predetermined condensate line blockage criteria comprises a number of trips of the condensate drain line switch during the call for cooling exceeding a predetermined threshold in a predetermined period of time.

15. A fluid conduit blockage detection system comprising:
a fluid conduit;
a switch positioned to detect at least one of a flow and a level of fluid in the fluid conduit, the switch coupled to a device that generates a fluid that flows through the fluid conduit, the switch operative to shut down the device when at least one of the flow is outside a predetermined flow range and the level exceeds a predetermined level range; and
a controller configured to monitor a position of the switch and a call for operation of the device and to determine a pattern of switch tripping versus the call for operation of the device, the controller further configured to transmit a prediction of a blockage of the fluid conduit based on the pattern of switch tripping.

16. The system of claim 15, wherein the flow of fluid in the fluid conduit is intermittent.

17. The system of claim 15, wherein the device is embodied in an air handler comprising a heat exchanger and a condensate collection tray, the fluid conduit coupled in flow communication with the condensate collection tray.

18. The system of claim 15, wherein the device is communicatively coupled to a thermostat, the thermostat generating the call for operation of the device.

19. The system of claim 15, wherein the controller is configured to determine the pattern of switch tripping versus the call for operation of the device by tallying a number of the switch tripping occurrences during a call for operation of the device.

20. The system of claim 15, wherein the controller is configured to determine the pattern of switch tripping versus the call for operation of the device by determining a time period between the call for cooling and each switch tripping occurrence.

* * * * *